(12) United States Patent
Niedermann

(10) Patent No.: US 12,270,567 B2
(45) Date of Patent: Apr. 8, 2025

(54) PORTABLE AIR TREATMENT APPARATUS

(71) Applicant: Dirk Niedermann, Naples, FL (US)

(72) Inventor: Dirk Niedermann, Naples, FL (US)

( * ) Notice: Subject to any disclaimer, the term of this patent is extended or adjusted under 35 U.S.C. 154(b) by 237 days.

(21) Appl. No.: 17/461,128

(22) Filed: Aug. 30, 2021

(65) Prior Publication Data

US 2022/0065492 A1 Mar. 3, 2022

Related U.S. Application Data

(60) Provisional application No. 63/072,636, filed on Aug. 31, 2020.

(51) Int. Cl.
*F24F 13/20* (2006.01)
*F24F 6/12* (2006.01)
*F24F 6/00* (2006.01)

(52) U.S. Cl.
CPC ............... *F24F 13/20* (2013.01); *F24F 6/12* (2013.01); *F24F 2006/008* (2013.01)

(58) Field of Classification Search
CPC ........ F24F 13/20; F24F 6/12; F24F 2006/008; F24F 13/08; F24F 2221/38; F24F 6/14; Y02B 30/54
See application file for complete search history.

(56) References Cited

U.S. PATENT DOCUMENTS

| | | | |
|---|---|---|---|
| 10,168,064 B1 * | 1/2019 | Zhang | F24F 6/12 |
| 2004/0067181 A1 * | 4/2004 | Shin | A61L 9/22 |
| | | | 422/123 |
| 2007/0075448 A1 * | 4/2007 | Niedermann | F24F 6/00 |
| | | | 261/DIG. 65 |
| 2008/0148696 A1 * | 6/2008 | Niedermann | F24F 8/10 |
| | | | 55/357 |
| 2011/0009048 A1 * | 1/2011 | Niedermann | F24F 6/02 |
| | | | 165/104.34 |

(Continued)

FOREIGN PATENT DOCUMENTS

| | | | |
|---|---|---|---|
| CN | 107101303 A | * | 8/2017 |
| CN | 108253572 | * | 7/2018 |

(Continued)

OTHER PUBLICATIONS

Epo translation of KR20170053311 (Year: 2017).*

(Continued)

*Primary Examiner* — Stephen Hobson
(74) *Attorney, Agent, or Firm* — Wood, Phillips, Katz, Clark & Mortimer

(57) ABSTRACT

A portable air treatment unit has a frame defining a fluid reservoir; a tank for a supply of fluid; and a generator that causes fluid to be formed into droplets discharged through an outlet. Fluid droplets formed by the generator are moved in a controlled path between a first location and the outlet. The controlled path is bounded by at least one surface. The portable air treatment unit is reconfigurable between: (a) a first state wherein at least a portion of the at least one surface can be directly accessed at a second location between the first location and outlet to facilitate cleaning of the at least portion of the at least one surface; and (b) a second state wherein direct access to the at least portion of the at least one surface at the second location is blocked.

24 Claims, 11 Drawing Sheets

(56) References Cited

U.S. PATENT DOCUMENTS

| | | | | |
|---|---|---|---|---|
| 2011/0221078 | A1* | 9/2011 | Lev | F24F 6/12 |
| | | | | 261/DIG. 89 |
| 2017/0363308 | A1* | 12/2017 | McDonnell | F24F 11/0008 |
| 2018/0195747 | A1* | 7/2018 | Xiao | F24F 6/02 |
| 2018/0245806 | A1* | 8/2018 | Medina | F24F 3/14 |
| 2018/0335221 | A1* | 11/2018 | Cho | F24F 1/0087 |
| 2019/0041074 | A1* | 2/2019 | Minakian | G01F 23/266 |
| 2019/0041075 | A1* | 2/2019 | Sarkar | F24F 11/62 |
| 2019/0293309 | A1* | 9/2019 | Cai | F24F 6/12 |
| 2019/0301756 | A1* | 10/2019 | Luo | F24F 8/30 |
| 2019/0309967 | A1* | 10/2019 | Seo | F24F 6/00 |
| 2020/0284451 | A1* | 9/2020 | Yang | F24F 6/02 |
| 2020/0340694 | A1* | 10/2020 | Yang | F24F 6/12 |
| 2020/0378636 | A1* | 12/2020 | Yang | F24F 13/06 |
| 2021/0318004 | A1* | 10/2021 | Niedermann | F24F 6/02 |
| 2021/0341158 | A1* | 11/2021 | Niedermann | F24F 6/00 |
| 2022/0128248 | A1* | 4/2022 | Xu | F24F 11/88 |

FOREIGN PATENT DOCUMENTS

| | | | | |
|---|---|---|---|---|
| CN | 108253572 A | * | 7/2018 | F24F 6/00 |
| CN | 207881061 U | * | 9/2018 | |
| CN | 109282411 A | * | 1/2019 | F24F 13/00 |
| CN | 109737539 A | * | 5/2019 | F24F 11/88 |
| CN | 109844421 A | * | 6/2019 | F24F 13/20 |
| CN | 110017559 A | * | 7/2019 | F24F 13/00 |
| CN | 209263241 | * | 8/2019 | |
| DE | 202017104613 U1 | * | 10/2017 | A01K 1/0047 |
| EP | 3462094 A1 | * | 4/2019 | F24D 13/00 |
| KR | 2017053311 A | * | 5/2017 | F24F 13/20 |
| KR | 20170053311 | * | 5/2017 | |
| KR | 1743032 B1 | * | 6/2017 | F24F 13/20 |
| KR | 2017077644 A | * | 7/2017 | |
| KR | 1789048 B1 | * | 10/2017 | F24F 6/12 |
| KR | 2018014565 A | * | 2/2018 | F24F 11/0008 |
| KR | 2018072236 A | * | 6/2018 | F24F 13/082 |
| KR | 2018073361 A | * | 7/2018 | F24F 11/0008 |
| KR | 2018076625 A | * | 7/2018 | B65D 25/2897 |
| KR | 2018096994 A | * | 8/2018 | B05B 17/06 |
| KR | 1939043 B1 | * | 1/2019 | F24F 6/12 |
| KR | 2019001334 A | * | 1/2019 | F24F 11/0008 |
| KR | 2019003072 A | * | 1/2019 | F16K 33/00 |
| KR | 2019003104 A | * | 1/2019 | F24F 11/0008 |
| KR | 2019027481 A | * | 3/2019 | F24F 13/02 |
| KR | 2019029815 A | * | 3/2019 | F24F 11/0008 |
| KR | 2019029818 A | * | 3/2019 | F24F 6/06 |
| KR | 2019029819 A | * | 3/2019 | F24F 13/20 |
| KR | 2019029909 A | * | 3/2019 | F24F 11/0008 |
| KR | 2019030248 A | * | 3/2019 | F24F 11/0008 |
| KR | 2019030251 A | * | 3/2019 | F24F 6/06 |
| KR | 2019101349 A | * | 8/2019 | B03C 3/04 |
| WO | WO-2018110945 A1 | * | 6/2018 | F24F 13/20 |
| WO | WO-2019009614 A1 | * | 1/2019 | F24F 11/0008 |
| WO | WO-2019111667 A1 | * | 6/2019 | B05B 17/0615 |

OTHER PUBLICATIONS

Epo translation of CN 209263241 (Year: 2019).*
"Interference fit" Wikipedia published Oct. 18, 2018 accessed at <https://en.wikipedia.org/w/index.php?title=Interference_fit&oldid=864611069> (Year: 2018).*
Epo translation of CN108253572 (Year: 2018).*

* cited by examiner

PORTABLE AIR TREATMENT APPARATUS

CROSS-REFERENCE TO RELATED APPLICATIONS

This application claims priority of Provisional Ser. No. 63/072,636, filed Aug. 31, 2020, the disclosure of which is hereby incorporated by reference in its entirety.

BACKGROUND OF THE INVENTION

Field of the Invention

This invention relates to air treatment apparatus and, more particularly, to a portable air treatment apparatus that generates fluid droplets that are entrained in the atmosphere within which the apparatus resides.

Background Art

A multitude of portable air treatment apparatus have been devised and are used in many different environments to increase the humidity in a space. Generally, these apparatus fall into one of two different categories. In one category, a fluid is heated to generate vapor that is controllably delivered into a space. In the second category, a nebulizer, or other similar structure, is utilized to create water droplets without the need to heat the fluid to change its state.

Typically, the apparatus will operate using water by itself or water with some additive(s). A supply of water is contained in a tank which can be refilled conveniently by a user. In one common design, a frame that supports the tank defines a reservoir in which the water droplets are generated, ultimately to be discharged to an outlet into the space within which the apparatus resides.

The bounding surfaces of the reservoir and the supply containment surfaces on the tank are continuously exposed to the water that is being processed. Virtually all supplies of water, including distilled water, are prone to generating mold, bacteria, and other contaminants. This is particularly a problem when the apparatus is not in use and the water is not being continuously discharged or otherwise agitated.

Persons handling the apparatus, or within the vicinity of the apparatus as it is being operated, may be exposed to these contaminants. In the former case, direct contact with the contaminants may result in transmission. During operation, the droplets may transfer the contaminants from the water within the apparatus to the surrounding space.

Thus, it is encouraged that all users of these types of apparatus use clean water supplies and regularly clean surfaces on the apparatus exposed to water to minimize generation and transportation of unwanted contaminants.

With apparatus having separable tanks, the cleaning process usually involves accessing the reservoir surfaces, which become exposed with the tank removed, and flushing the interior of the tank as with an additive that will allow controlled discharging of the contaminant and/or neutralizing any undesired characteristic thereof.

Generally, the tanks have a number of crevices and configurations that make direct access thereto difficult or impossible. Cleaning is particularly challenging since some tanks are designed so that the containment volume for the supply cannot be penetrated by a person's hand, thereby necessitating the use of instruments which may be not be configured to effectively access all of the potential contaminant bearing surfaces.

A particularly critical region of the apparatus, in terms of avoiding contamination, is the passage between the fluid droplet generator and the outlet for the generated water droplets. A common design utilizes a conduit configuration that defines a passage upwardly from the droplet generation location to the droplet outlet. This passage will typically be at a vertical center axis location. While this is a logical path for the generated water droplets, it requires that the conduit shape pass through the liquid supply volume. This tends to crowd the fluid containment volume within the tank and thus creates a challenge to access the passage bounding surfaces to allow effective cleaning thereof. Further, since the cross section of the passage is relatively narrow to facilitate overall compact construction, a thorough cleaning and decontamination may be difficult and inconvenient. Consequently, users may do an inadequate job of cleaning, or altogether forego cleaning, of critical passage surfaces upstream of the droplet outlet.

The industry continues to seek improved designs of apparatus of this type that are compact, affordable to manufacture, and sufficiently easy to clean that users will routinely adequately maintain the apparatus and operate the same in a safe manner.

SUMMARY OF THE INVENTION

In one form, the invention is directed to a portable air treatment unit having a frame defining at least part of a fluid reservoir. A tank on the frame bounds at least part of a volume in which a supply of fluid can be placed, A generator on the frame causes fluid from the supply of fluid to be formed into droplets. The portable air treatment unit has an outlet for discharging fluid droplets formed by the generator to within a space within which the portable air treatment unit resides. The air treatment unit is configured so that fluid droplets formed by the generator are moved in a controlled path between a first location, at which the fluid droplets are formed by the generator, and the outlet. The controlled path is bounded by at least one surface. The portable air treatment unit is reconfigurable between: (a) a first state wherein at least a portion of the at least one surface can be directly accessed at a second location between the first location and outlet to facilitate cleaning of the at least portion of the at least one surface: and (b) a second state wherein direct access to the at least portion of the at least one surface at the second location is blocked.

In one form, the tank has a peripheral surface extending around a vertical center axis. With the portable air treatment unit in the first state, the at least portion of the at least one surface is exposed at the peripheral surface of the tank at the second location.

In one form, the tank has a top and bottom. The at least one surface bounds a channel that extends in a direction between the top and bottom of the tank.

In one form, the channel is at least partially recessed radially with respect to the vertical center axis from the peripheral surface of the tank.

In one form, the channel has a length and is U-shaped as viewed in cross section taken transversely to the length of the channel.

In one form, the "U" shape changes progressively over at least a part of the length of the channel.

In one form, the "U" shape bounds a larger volume at a bottom location than at a top location on the channel.

In one form, the tank has a top and bottom. The at least one surface bounds a channel with a length extending over at least a majority of a distance between the top and bottom of the tank.

In one form, the tank has a vertical center axis. The channel opens radially with respect to the vertical center axis.

In one form, the tank has a body. The portable air treatment unit further includes a cover assembly. The cover assembly is selectively changeable between: (a) a first position relative to the tank body wherein the portable air treatment unit is in the first state, and (b) a second position relative to the tank body wherein the portable air treatment unit is in the second state.

In one form, the tank body bounds the volume within which the supply of fluid can be placed. The channel is formed on the tank body. With the cover assembly in the first position, the cover assembly is fully separated from the body. With the cover assembly in the second position, the cover assembly blocks an opening at the second location to close the channel at the second location.

In one form, the cover assembly is configured to be changed from its first position into its second position by press connecting the cover assembly to the body.

In one form, the cover assembly has a body with an elongate main portion with a length. A first wall projects angularly with respect to the length of the elongate main portion away from the elongate main portion. The first wall is situated below the channel and above the first location with the cover assembly in the second position.

In one form, the first wall has a passage configured to guide upwardly moving fluid droplets formed by the generator into the channel.

In one form, the tank body has a depending guide wall that in conjunction with the cover assembly at least partially bounds a sub-volume below the channel.

In one form, the cover assembly and tank body have elongate rib and receptacle connectors that cooperate to create a seal between the cover assembly and tank body that causes an opening in the channel to be sealed by the cover assembly with the cover assembly in the second position.

In one form, the tank has a peripheral surface that extends around a vertically extending center axis. With the cover assembly in the second position, circumferentially spaced edges of an outer surface of the cover assembly substantially flushly conform to the peripheral surface of the tank.

In one form, the tank has a body with a top opening with the channel formed on the tank body. The portable air treatment unit further includes a nozzle assembly that is separably attached to the tank body. The nozzle assembly has a plate that is situated over a top tank opening and has a discrete opening in registration with an opening at a top end of the channel.

In one form, the nozzle assembly further includes a guide component: (a) defining a funneling surface bounding a volume in communication with the discrete opening; and (b) defining the outlet for the portable air treatment unit.

In one form, the plate on the nozzle assembly and guide component are configured to be movable, one relative to the other and the tank body to thereby selectively change a direction of discharging droplets at the outlet for the portable air treatment unit.

In one form, the air treatment unit further includes a source of scented air that is delivered to the sub-volume and mixed with fluid droplets moving through the passage in the first wall.

BRIEF DESCRIPTION OF THE DRAWINGS

FIG. 1 is a schematic representation of an air treatment unit into which the present invention is incorporated and including a tank, for containing a supply of fluid, connected to a frame;

FIG. 2 is a schematic representation of the tank in FIG. 1 and showing further details thereof;

FIG. 3 is a schematic representation of the tank in FIG. 1 and showing additional details thereof;

FIG. 4 is a perspective view of one exemplary form of the inventive air treatment unit, as shown schematically in FIGS. 1-3;

FIG. 5 is a view as in FIG. 4 wherein a nozzle assembly thereon has been repositioned to change a discharge direction for generated fluid droplets;

FIG. 6 is a top view of the frame on the air treatment unit in FIGS. 4 and 5 with the tank separated therefrom;

FIG. 7 is a perspective view of the tank on the air treatment unit in FIGS. 4 and 5 with a plate on the nozzle assembly separated from a body of the tank;

FIG. 8 is a view as in FIG. 7, from a different perspective, and with the plate and a cover assembly, shown in place in FIG. 7, separated from the tank;

FIG. 9 is a top view of the air treatment unit in FIGS. 4 and 5 with the plate on the nozzle assembly separated from the tank;

FIG. 10 is a fragmentary, perspective view of the tank on the air treatment unit in FIGS. 4 and 5 with a guide component on the nozzle assembly separated from the plate on the nozzle assembly and the tank body;

FIG. 11 is a perspective view of the air treatment unit in FIGS. 4 and 5 with a cover assembly separated from the tank, the nozzle assembly absent, and a user's hand grasping the tank to effect lifting thereof;

FIG. 12 is a fragmentary, perspective view as in FIG. 11 wherein the nozzle assembly is in place;

FIG. 13 is a fragmentary, perspective view of the air treatment unit in FIGS. 4 and 5 and showing a bottom portion of the tank with the cover assembly separated therefrom;

FIG. 14 is a fragmentary, perspective view showing the top of the tank on the air treatment unit in FIGS. 4 and 5 with the guide component on the nozzle assembly separated from the plate on the nozzle assembly;

FIG. 15 is an exploded perspective view of the nozzle assembly on the air treatment unit in FIGS. 4 and 5;

FIG. 16 is a perspective view of a frame on the air treatment unit in FIGS. 4 and 5 with a fluid level float within a reservoir and in a lowered position;

FIG. 17 is a perspective view of the plate on the nozzle assembly on the air treatment unit in FIGS. 4 and 5;

FIG. 18 is a schematic representation of a generic form of tank and cooperating cover assembly, according to the invention;

FIG. 19 is a perspective view of the frame on the air treatment unit in FIGS. 4 and 5 with an aromatic pad being operatively placed and making up part of a source of scent for discharging fluid droplets;

FIG. 20 is a top view of the frame on the air treatment unit in FIGS. 4 and 5;

FIG. 21 is a perspective view of the frame on the air treatment unit in FIGS. 4 and 5 with the fluid level float raised, resulting from a higher water level in the reservoir than in FIG. 16;

FIG. 22 is bottom perspective view of the frame on the air treatment unit in FIGS. 4 and 5 with a schematic representation of a light usable therewith and provided on the cooperating frame;

DETAILED DESCRIPTION OF THE PREFERRED EMBODIMENT

Figure 1:
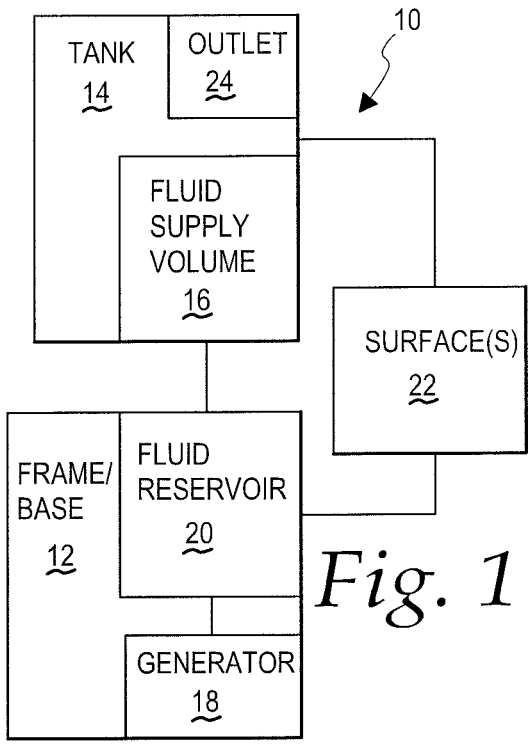

The present invention is directed to a portable air treatment apparatus/unit ("unit") of the type shown in schematic form at 10 in FIG. 1. The air treatment unit consists of a frame/base ("frame") 12. A tank 14 is provided on the frame 12 and may be fixedly connected thereto. More preferably, the tank 14 is designed to be separable from the frame 12 to allow independent handling thereof, as when cleaning the unit 10 or replenishing a supply of fluid in a fluid supply volume 16 defined by the tank 14.

A generator 18 on the frame 12 processes fluid from the volume 16 delivered to a fluid reservoir 20 defined at least partially on the frame 12. The generator 18 causes fluid in the reservoir 20 to be formed into droplets. The generator 18 may take any form that creates droplets, whether by heating to form vapor, ultrasonically vibrating the water to produce droplets, or by any other means, such as but not limited to, those utilizing wicking technology, natural evaporation, diffusers, etc.

The formed droplets are moved in a controlled path, defined by at least one surface 22 on at least one of the frame 12 and tank 14, to an outlet 24, which may be considered part of, or separate from, the tank 14. The outlet 24 causes a controlled discharge of the fluid droplets to within a space within which the unit 10 is operated.

Figure 2:
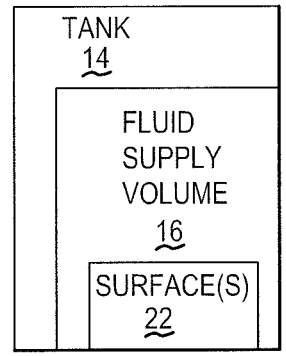

As shown schematically in FIG. 2, a portion of the controlled path is defined by at least one surface 22 on the tank 14. Conventionally, the at least one surface 22 on the tank 14 resides on a structure that passes through the fluid supply volume 16.

Figure 3:
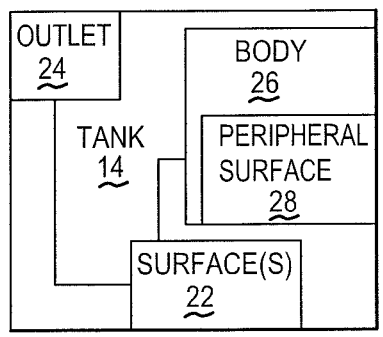

As depicted in FIG. 3, the tank 14 has a body 26 with a peripheral surface 28 extending around a center vertical axis. The at least one surface 22 conventionally defines a conduit configuration that is spaced fully from the peripheral surface 28 in a radial direction with respect to this vertical center axis.

With a conventional design, cleaning of the at least one surface 22 is generally required to be effected by accessing the same through the outlet 24 or through an underside communication opening. Since the effective diameter of the passage bounded by the conduit shape is relatively small, effective cleaning of the at least one surface 22 may be difficult.

Further, by reason of the described conventional location, the conduit shape takes up a portion of the fluid supply volume 16 which thus interferes with access to surfaces bounding the fluid supply volume 16—surfaces that require regular cleaning/maintenance.

One exemplary form of the above type of unit 10, in conventional form, is shown in U.S. Pat. No. 10,729,871, the disclosure of which is incorporated herein by reference. Similarly, the disclosure in Provisional Ser. No. 63/072,636, filed Aug. 31, 2020, is incorporated herein by reference in its entirety.

Figure 4:
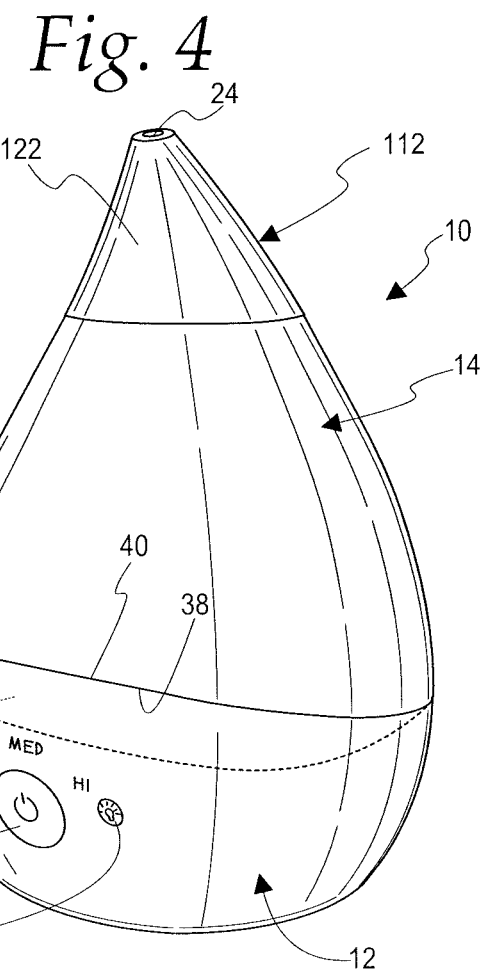
Figure 5:
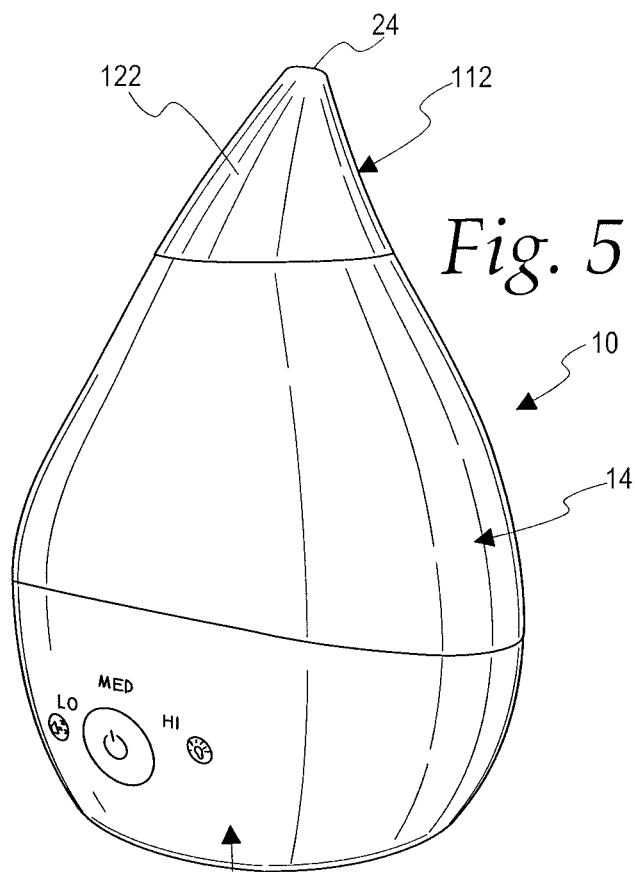
Figure 6:
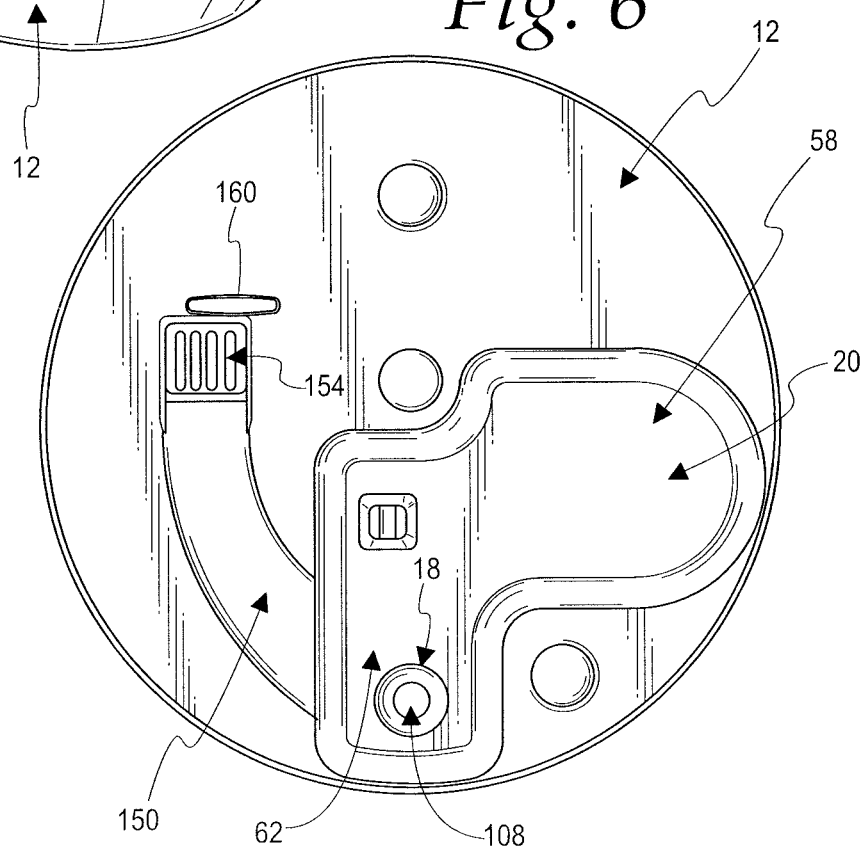
Figure 7:
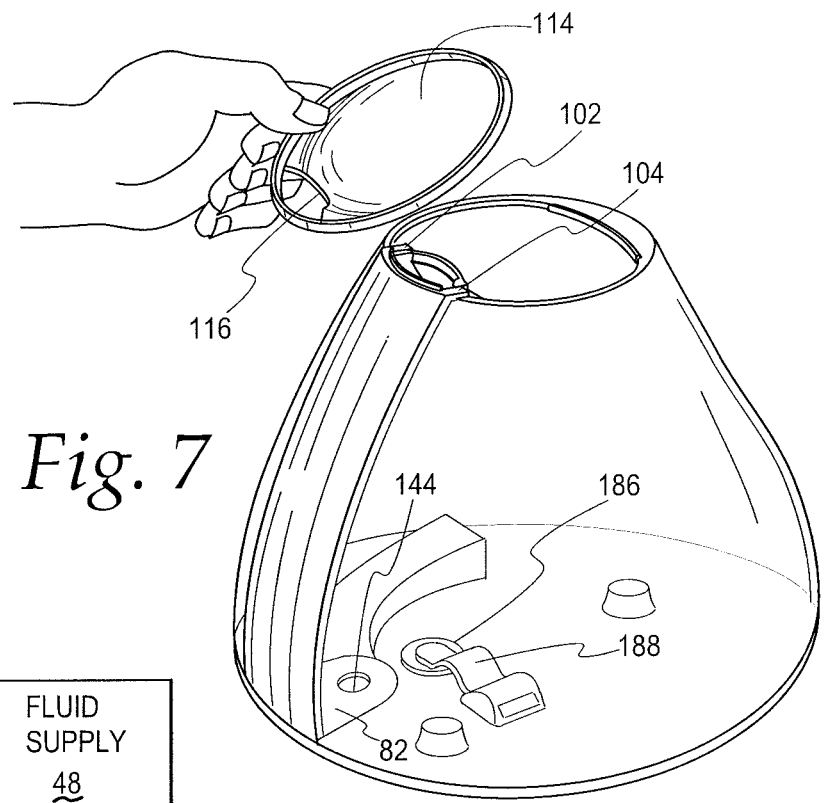
Figure 8:
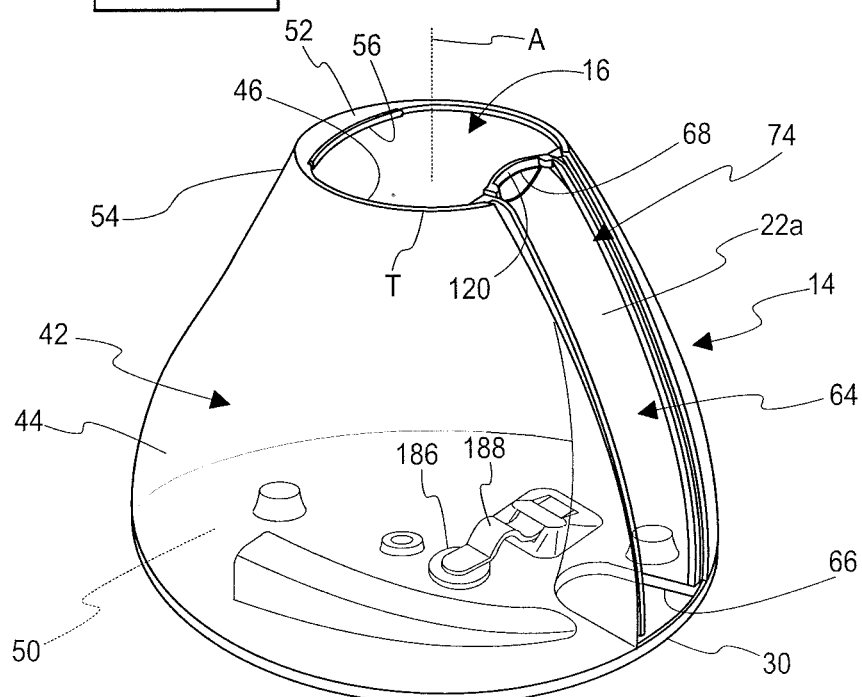
Figure 9:
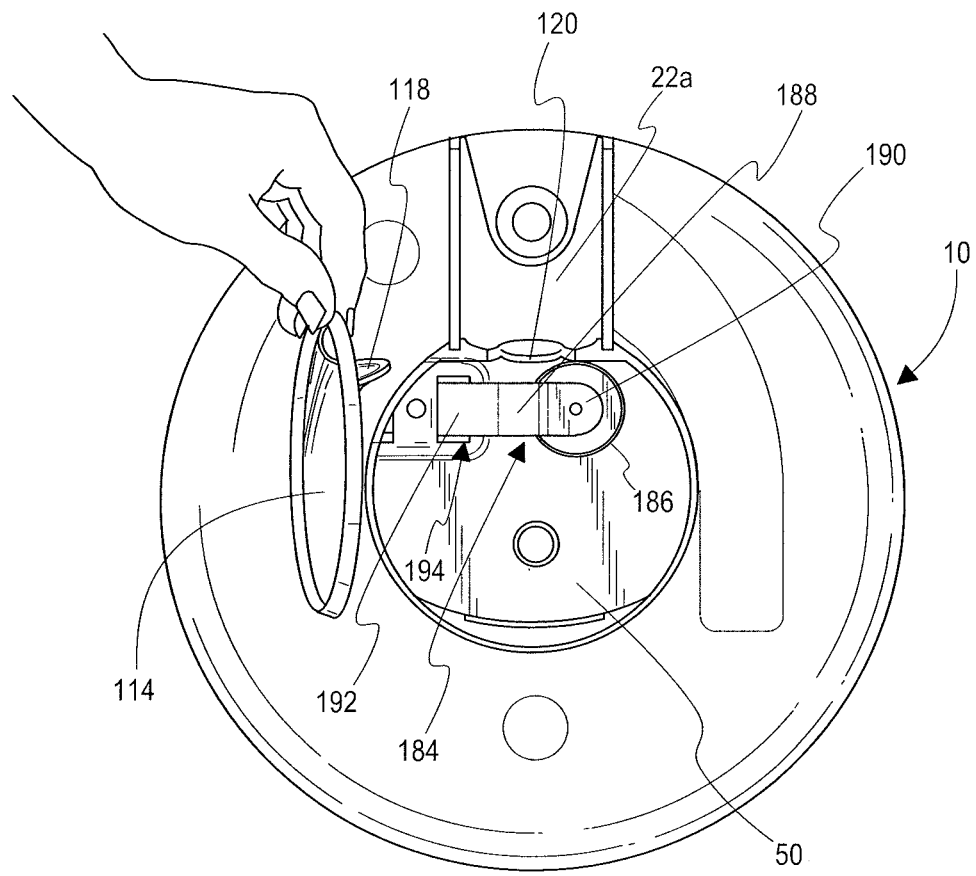
Figure 10:
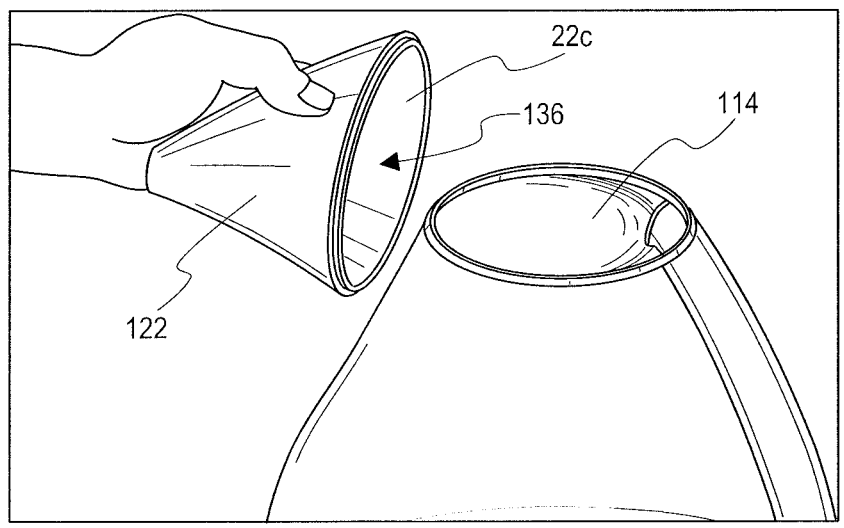

FIGS. 4-17, 19-24, and 28 show one exemplary form of the inventive air treatment unit 10, depicted schematically in FIGS. 1-3. The air treatment unit 10 has a frame 12 on which a tank 14 is removably placed. In this embodiment, the tank 14 has a bottom surface 30 that bears against an upwardly facing frame surface 32 to maintain an operative connection between the frame 12 and tank 14, as shown in FIGS. 4 and 5.

The tank 14 has an undercut wall portion 34 (FIG. 4) that resides in vertically overlapping relationship with an upwardly projecting wall portion 36 on the frame 12 with the frame 12 and tank 14 in connected relationship. In this connected relationship, a downwardly facing peripheral edge 38 on the tank 14, at the top of the wall portion 34, bears upon a complementarily-shaped, upwardly facing edge 40 on the frame wall portion 36.

By matching the perimeter shapes of the non-circular cooperating portions of the tank 14 and frame 12, the tank 14 and frame 12 are stably maintained in keyed, connected relationship, which can be consistently established by aligning the frame 12 and tank 14 in a predetermined manner around a vertical center axis A and relatively moving the frame 12 and tank 14 along the vertical center axis A towards each other. The tank 14 can be separated by overcoming any frictional forces generated between the cooperating parts on the operatively connected frame 12 and tank 14.

The tank 14 has a body 42 with a peripheral wall 44 extending around the vertical center axis A. The top of the tank 14 has a top/fill opening 46 through which a fluid supply 48 can be directed into the fluid supply volume 16 bounded by the peripheral wall 44 and a bottom wall 50.

In this embodiment, a wall portion 52 projects radially inwardly from an outwardly facing peripheral surface 54 on the peripheral wall 44 at the location of the fill opening 46, thereby forming a downwardly facing edge 56 under which a user's fingers F (FIG. 11) can be placed to generate an upward lifting force to facilitate the convenient carrying of the tank 14, as with the volume 16 filled with fluid.

The fluid reservoir 20 has a generally L shape, as viewed from above. One leg 58 of the L accommodates a paddle, the function of which will be described below.

The other leg 62 of the L defines a footprint in which the top of the generator 18 is located. In this embodiment, the generator 18 is in the form of a nebulizer, with it being understood that there is no limitation as to the nature of the generator 18.

Operation of the generator 18 causes water droplets to be formed and to rise from the reservoir leg 62 and into a channel 64 formed at the peripheral wall 44.

In this embodiment, the channel 64 is elongate with a length extending fully between the bottom B and top T of the tank 14. An opening 66 is provided through the bottom tank wall 50 at the bottom of the channel 64. The top of the channel 64 has an opening 68.

In this embodiment, the channel 64 is bounded by a surface 22a. The channel 64 has a "U" shape, as viewed in cross-section taken transversely to the length of the channel 64. In the depicted embodiment, the "U" shape changes progressively over a length of the channel 64. While not required, in this embodiment, the "U" shape bounds a larger volume at a bottom location than at a top location on the channel 64. As depicted, the "U" shape progressively diminishes in terms of the volume bounded by the "U" shape between the bottom and top of the channel 64. The "U" shape opens radially with respect to the vertical center axis A over its entire vertical extent.

In the depicted embodiment, the channel 64 is recessed radially with respect to the vertical center axis A over the entire lengthwise extent thereof between the bottom B and top T of the tank 14. This is not a requirement but it is preferred that at least a part of the channel 64 be recessed radially inwardly with respect to the peripheral tank surface 54.

It is also contemplated that the channel length might extend less than the full extent between the top T and bottom B of the tank 14. It is preferred that the length of the channel 64 extend over at least a majority of the distance between the top T and bottom B of the tank 14.

As depicted, the channel surface 22a is integrally formed with the peripheral wall 44. Again, this is not a requirement. With this construction, the channel surface 22a produces an open configuration with a radially outer opening 74.

The opening 74 is blocked by a cover assembly 76 which conforms to the opening 74 so that, with the cover assembly 76 connected, the opening 74 is blocked and preferably sealed so that a conduit shape is produced over the full vertical length of the channel 64.

Figure 12:
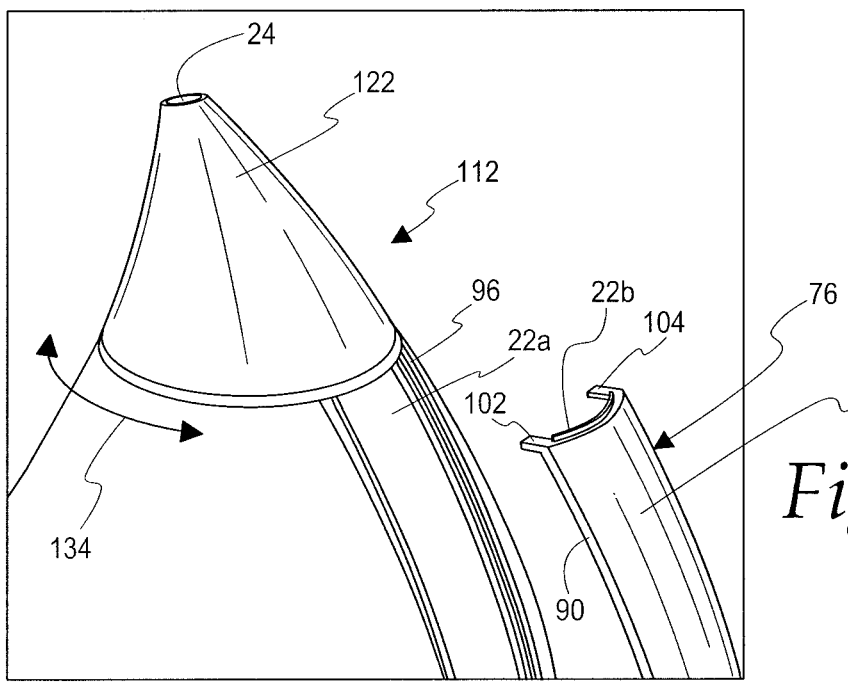
Figure 13:
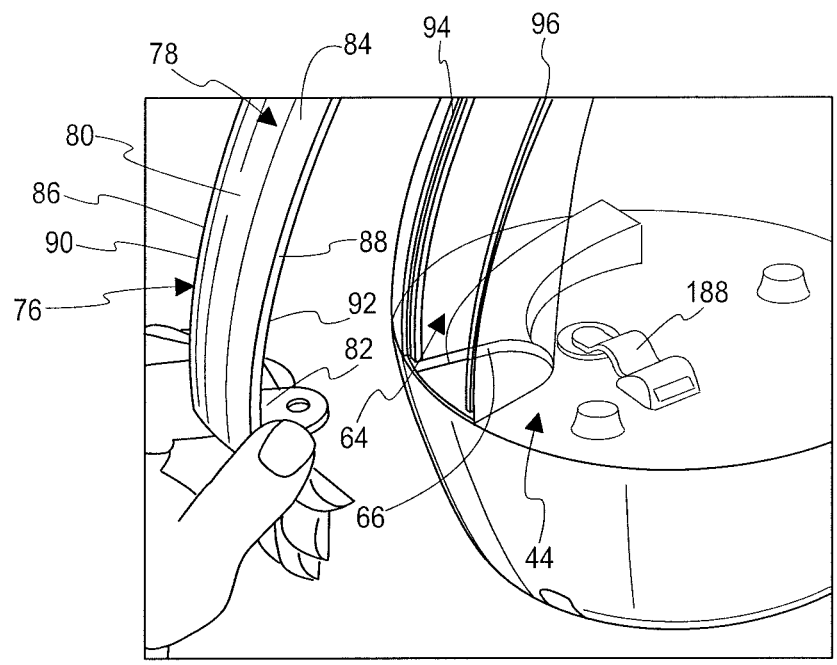
Figure 14:
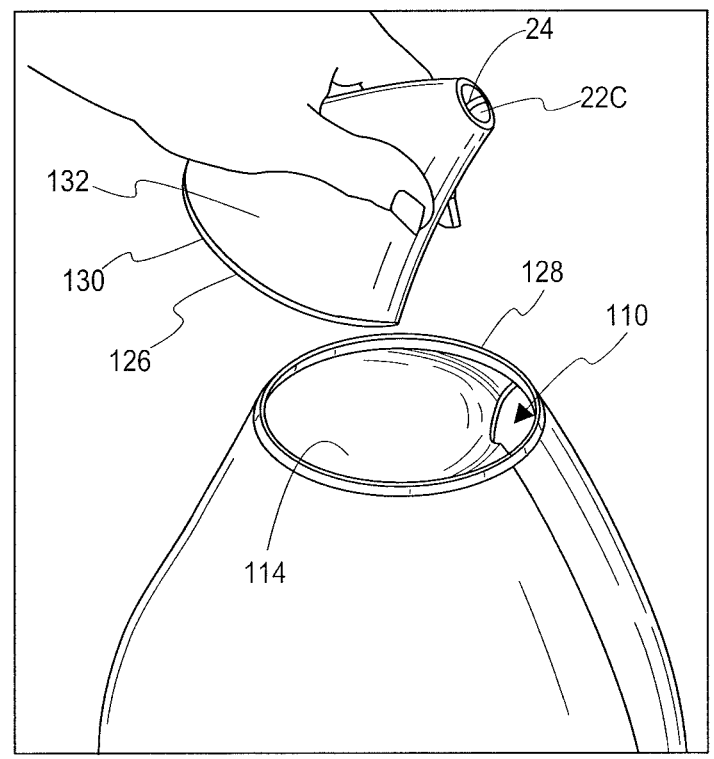
Figure 15:
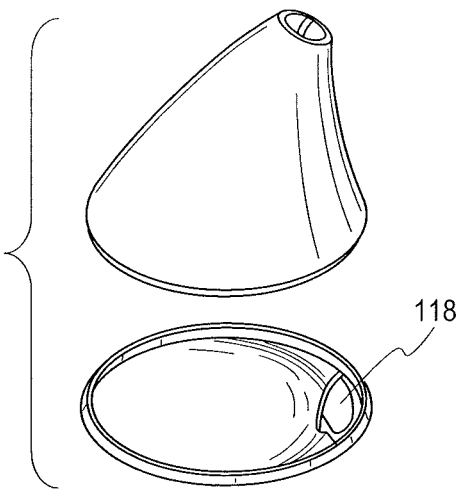

In the depicted form, the cover assembly 76 can be changed between a first position shown in FIGS. 12-14, fully separated from the tank 14, into a second position, as shown in FIGS. 7, 10, 14, and 22, wherein a second surface 22b on the cover assembly 76 blocks the channel opening 74.

The cover assembly 76 has a body 78 with an elongate main portion 80 with a length and a first wall 82 angularly disposed with respect to the length of the elongate main portions 80.

For purposes of aesthetics and streamlining, with the cover assembly 76 moved from the first position into the second position, wherein the surface 22b on the cover assembly 76 blocks the opening 74, an outer surface 84 on the elongate main portion 80 at least nominally conforms to the shape of the peripheral surface 54 at circumferentially opposite sides/edges thereof. As depicted, circumferentially spaced edges 86,88 on the main portion 80 substantially flushly conform to the peripheral surface 54 there adjacent.

In the depicted embodiment, ribs 90,92 are formed at the edges 86,88 respectively, which are respectively press fit into complementary receptacles 94,96 at the circumferentially spaced edges bounding the channel 64. The interacting surfaces can be made from a material that allows a slight deformation thereof to cause a seal to be created as the ribs 90,92 are pressed into the receptacles 94,96.

Figure 25:
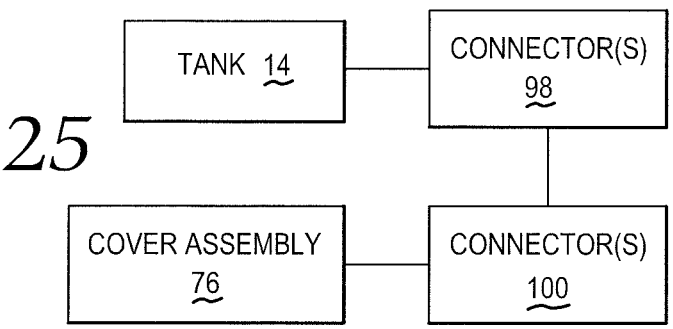
FIG. 25 is a schematic representation of a generic form of connection between a tank and cover assembly, according to the invention.

As shown schematically in FIG. 25, it is contemplated that virtually an unlimited number of different forms of connection may be used between the tank 14 and cover assembly 76. In FIG. 25, at least one connector 98 on the tank 14 cooperates with at least connector 100 on the cover assembly 76 to allow a maintainable connection whereby the cover assembly 76 effectively blocks the channel opening 74 as an incident of the cover assembly 76 being changed from its first position into its second position.

Figure 11:
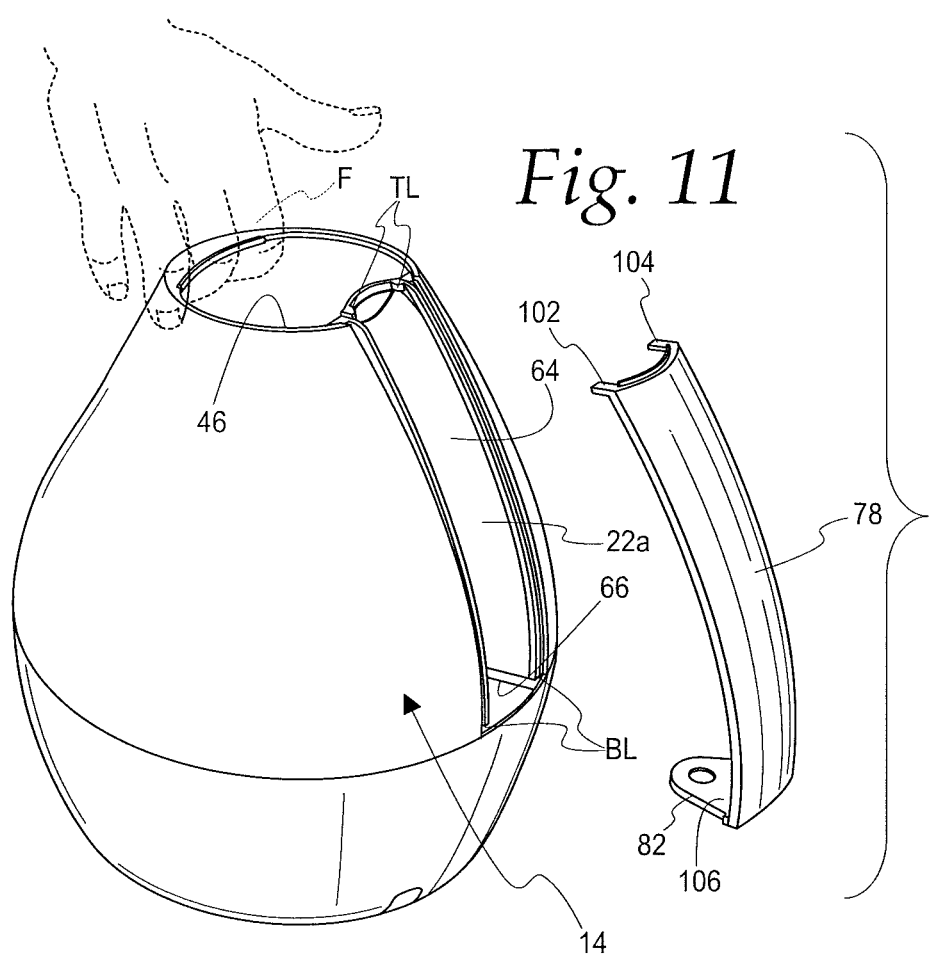
Figure 22:
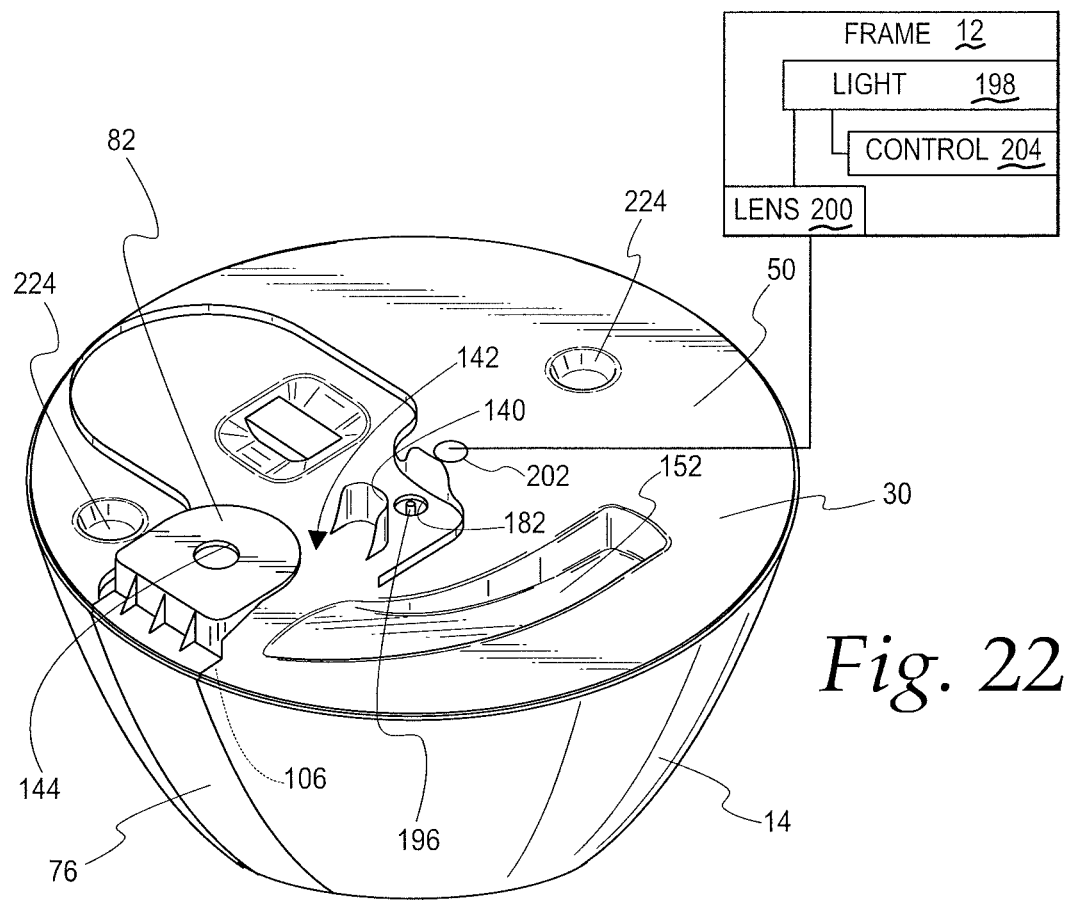
Figure 23:
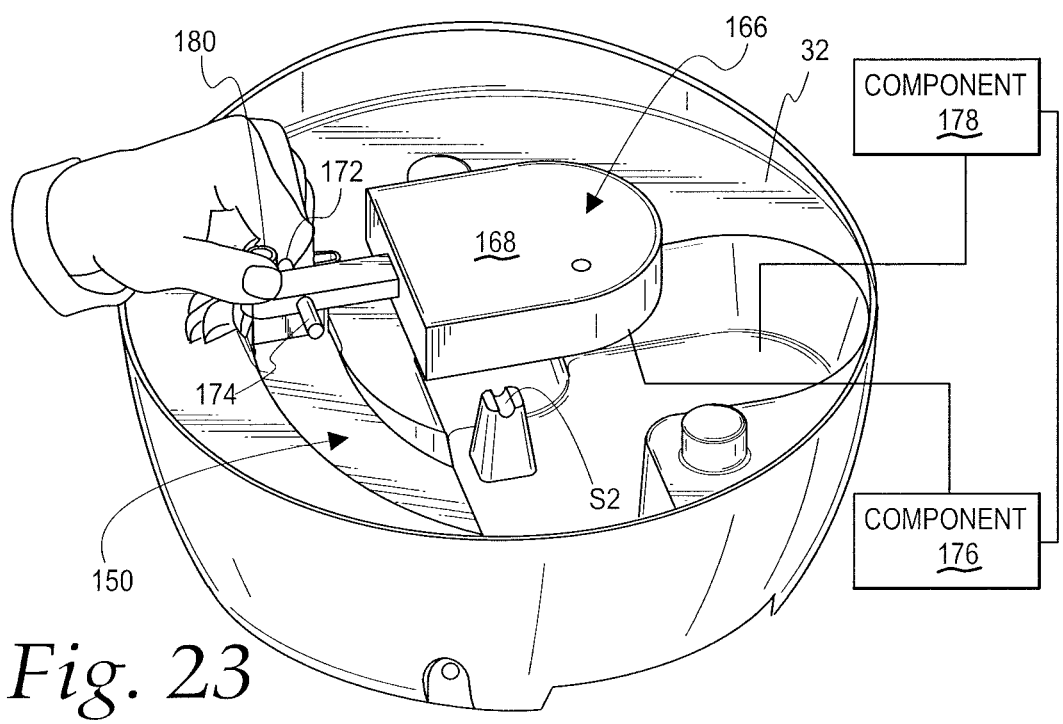
FIG. 23 is a view as in FIG. 21 wherein the liquid level float is separated from the remainder of the frame.
Figure 24:
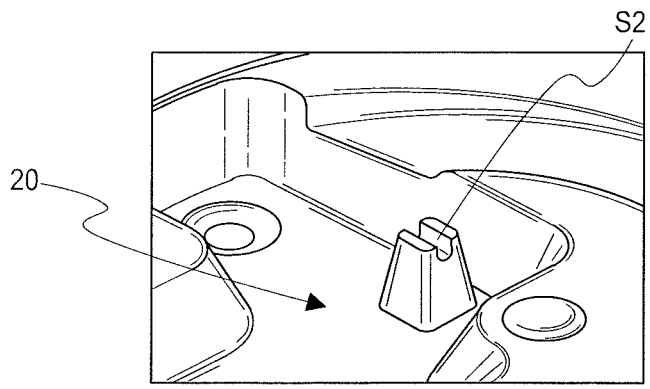
FIG. 24 is a fragmentary, perspective view of part of the reservoir on the frame on the air treatment unit in FIGS. 4 and 5 including a mount location for the fluid level float.

The cooperating connector arrangement along the circumferential edges 86,88 of the cover assembly 76 may by itself maintain the press fit cover assembly 76 positively in its second position. This holding capability is augmented by optional additional connectors, as shown in FIGS. 11, 12, and 22, in the form of tabs 102,104 at the top of the cover assembly 76 and a shoulder 106 at the bottom of the cover assembly 76 which captively engage the tank 14 through engagement at top and bottom locations TL, BL. The tabs 102,104 and the region at which the shoulder 106 is defined may have sufficient resilience that as the cover assembly 76 is press fit into its second position, the cover assembly 76 deforms in the vicinity of the tabs 102,104 and shoulder 106 to create a resilient restoring force that enhances the captive forces created by the cover assembly 76 on the tank 14.

It should be understood that the first wall 82 is an optional feature that performs different functions, as described below. It is possible to make the cover assembly 76 without the first wall 82 if these below-described functions are not desired.

With the cover assembly 76 in its second position and the tank 14 connected to the frame 12, the surfaces 22a,22b, respectively bounding the open channel and blocking the channel opening 74, cooperatively produce the aforementioned conduit configuration. This allows generated fluid droplets to move in a controlled path portion between a first location at 108, at which the fluid droplets are formed by the generator 18, and an upper discharge location at 110, at the top of the channel 64. That is, from the first location 108, the fluid droplets move through the bottom wall opening 66, defining the entry to the channel 64, and are guided controllably in a path upwardly to the top channel opening 68 at the discharge location 110.

At the top of the tank 14, a nozzle assembly at 112 is provided. The nozzle assembly 112 is separably attached to the tank body 42.

The nozzle assembly 112 consists of a plate 114, that spans across the top/fill opening 46 on the tank 14 and has a discrete opening 116 registrable with the top channel opening 68.

The plate 114 has a depending lip 118 that at least nominally conforms to a surface 120 around the channel opening 68. By directing the lip 118 into the opening 68 to reside against the surface 120, the plate 114 can be consistently located relative to the tank 14, to register the plate and channel openings 116,68, respectively.

The nozzle assembly 112 further includes a guide component 122 defining an internal funneling surface 22*c* that tapers from the bottom opening 126 to a top opening that defines the outlet 24. The funneling surface 22*c* bounds a volume that is in communication with the discrete opening 116 on the plate 114.

Through cooperating rims 128,130, respectively on the plate 114 and body 132 of the guide component 122, the guide component 122 and plate 114 can be guidingly turned relative to each other in a controlled path, as indicated by the double-headed arrow 134 in FIG. 12, to change a direction of discharging droplets at the outlet 24, as between representative different directions in FIGS. 4 and 5. This reorientation is made possible by having an angled funnel configuration for the surface 22*c* which is nonsymmetrical about a vertical axis.

A user can assemble the cover assembly 76 by moving it from its first position, fully separated from the tank 14, into its second position through a simple press connection step. As noted above, it is contemplated that separate connectors might be utilized to enhance the effectiveness of the connection and seal. However, simplification of operation is a desired objective.

With the cover assembly 76 in place, the tank 14 can be connected to the frame 12 by lowering the tank 14 thereagainst.

The nozzle assembly 112 can be assembled by placing the guide component 122 on the plate 114 and the plate 114 in turn against the tank 14, whereby the guide component 122 can be angularly moved relative to the plate 114 and the tank 14.

Fluid droplets formed by the generator 18 rise from the first location 108, move through the wall opening 66 into the channel 64, and are guided by the channel up to and through the channel opening 68 into a volume 136 bounded by the surface 22c in the guide component 122. The flow volume of fluid particles converges toward the outlet 24 from which they are ultimately discharged into the space.

The air treatment unit 10 is in a first state with the cover assembly 76 in its first position. In this first state, the surface 22a can be directly accessed at a location at the peripheral surface 54 of the tank body 42. In this embodiment, the entire surface 22a is directly exposed to be accessible for cleaning and has a shape without sharp corners that can be effectively cleaned without concern of contaminants being trapped in crevices, or the like. The surface 22*b* is likewise exposed to facilitate thorough cleaning thereof.

Once cleaning is effected, the cover assembly 76 can be moved into its second position, which represents a second state for the air treatment unit 10. In this state, the access to the surface 22*a* is blocked by the cover assembly 76.

The invention contemplates a more generic design, not limited to the specific form shown. As shown in FIG. 18, a tank 14' may have at least one surface 22' that is selectively exposed through an opening and blocked by a cover assembly 76', wherein only a portion of the surface 22' is exposed through the opening with the cover assembly 76' in the corresponding first position. The more limited access at a corresponding second location may still facilitate access to the remainder of the at least one surface 22'.

Within the generic showing in FIG. 18, it is also contemplated that the surface 22' does not have to be at the peripheral surface of the tank and could be more radially inwardly disposed than in the depicted embodiment.

As noted above, the incorporation of the optional first wall 82 offers additional operating capabilities. As seen in FIG. 22, with the cover assembly 76 in the second position, the first wall 82 is spaced below the bottom wall surface 30 on the tank 14.

A guide wall 140, depending from the bottom wall surface 30, is generally U-shaped and opens towards the first location 108. The bottom wall surface 30, guide wall 140, and cover assembly 76, including the first wall 82, cooperatively partially bound a sub-volume 142 below the channel 64.

Fluid droplets formed by the generator 18 advance upwardly through a passage 144, defined through the first wall 82, in vertical registration with the first location 108 above the generator 18.

As seen in FIG. 19, a source of scented air is provided at 146. The source 146 consists of an air mover 148 on the frame 12 that may be a component that performs another function in the overall unit 10 or a dedicated component, as in the form of a conventional fan.

The frame 12 has a curved, downwardly recessed guideway 150 that matches the footprint of an upwardly recessed cavity 152 in the tank 14. With the tank 14 and frame 12 connected, the guideway 150 and cavity 152 cooperatively define a curved passageway between an outlet 154, for air propelled by the air mover 148, and the sub-volume 142. The passageway diminishes in cross-sectional area from the outlet location to the sub-volume 142. As depicted, the outlet 154 is defined by a plurality of slots 156 in a raised, hollow, boss 158, which boss 158 keys within the cavity 152 to stabilize and facilitate consistent connection between the frame 12 and tank 14.

A holder 160 is provided adjacent to the outlet 154 at a side of the boss 158 opposite the side closest to the sub-volume 142. A scented pad 162 is configured to be dropped into the complementary receptacle 164 on the holder 160.

Accordingly, with the tank 14 connected to the frame 12, the air mover 148 causes air to impinge upon the scented pad 162 and to thereby be aromatized. The aromatized air is guided into the sub-volume 142 wherein it is mixed with fluid droplets formed by the generator 18. The aromatized droplets move through the passage 144 to and through the channel 64 ultimately to be discharged at the outlet 24.

In addition to performing this function, the depending portion of the cover assembly 76 may project into the fluid reservoir 20 so as to make a keyed connection with a bounding surface thereof to facilitate a consistent connected relationship between the frame 12 and tank 14 and further stabilize that connection.

A water level sensor float 166 is situated at the reservoir leg 58. The float 166 consists of a buoyant paddle 168 projecting from a stem 170 mounted through oppositely projecting posts 172,174 for pivoting movement around an axis between a lowered position, shown in FIG. 16, and a raised position, as shown in FIG. 21.

With the reservoir 20 filled with liquid, the paddle 168 is buoyed to assume the FIG. 21 position. When the liquid lever in the reservoir 20 drops below a certain, predetermined level, the paddle 168 assumes the FIG. 16 position whereupon a component 176 on the bottom of the paddle 168 interacts with a component 178, on or through the bottom wall 50, to shut the power to the unit 10 off.

The cooperating components 176,178 may take any form. As just one example, the component 176 may have a magnet which triggers a switch associated with the component 178.

Thus the unit 10 may be shut off when there is low liquid level in the reservoir 20 to avoid potential damage to the unit 10. The construction may be such that other features of the unit remain in operation, as discussed hereinbelow.

The float 166 further includes an upwardly projecting post 180 which functions as a valve actuator. As seen in FIG. 22, the bottom wall 50 of the tank 14 has an opening 182, With the tank 14 connected to the frame 12, fluid within the supply volume 16 can flow through the opening 182 to the reservoir 20. The post/actuator 180 aligns with the opening 182, as viewed from above.

A valve 184 consists of a disk 186 which, with the valve 184 in a closed position, covers/blocks the opening 182. An elongate valve arm 188 has one end 190 fixed to the disk 186, with the opposite end 192 fixed to the bottom wall 50. The arm 188 thus projects in cantilever fashion away from a mount location at 194 at which the end 192 is fixed. The elongate arm 188 is made of a material that will flex but has memory. Movement of the disk 186 upwardly from its closed position, into an open position, flexes the elongate arm 188. This creates a volume under the disk 186 through which fluid within the volume 16 can communicate through the opening 182 into the reservoir 20. When the flexing force on the elongate arm 188 is removed, the arm 188 assumes its undeformed state which causes the arm 188 to bias the disk 186 sealingly over the opening 182.

Changing of the valve 184 from its closed position into its open position is effected through the post/actuator 180. Upon the tank being connected to the frame 12, the post/ actuator 180 presses upwardly against an actuator pin 196, constructed to move with the disk 186, whereupon the valve 184 changes from its closed position into its open position. With the tank 14 separated from the frame 12, the disk 186 blocks the opening 182, whereby the tank can be filled and will retain all fluid within the volume 16.

As depicted, all exposed surfaces on the frame 12 have a curved shape with minimal sharp corners to avoid foreign matter buildup and facilitate cleaning thereof. Cleaning of the reservoir 20 is also facilitated by being able to remove the sensor float 166, which is press fit vertically into its operative position and removed therefrom by reversal of the assembly step. That is, the posts 172, 174 are press fit into complementary seats S1, S2.

Internal cleaning of the tank 14 is facilitated by minimizing the presence of any sharp corners near any surfaces that require cleaning. The use of the plate 114 allows the tank top/fill opening 46 to be relatively large which allows a user to direct his/her hand and lower arm region into the volume 16 to effect a thorough cleaning. This arrangement also permits top filling of the tank 14 which can be carried out with the tank on, or separated from, the frame 12.

In the depicted embodiment, the elongate arm 188 and disk 186 making up the valve 184 have a silicone coating to avoid foreign material adherence thereto.

Figure 16:
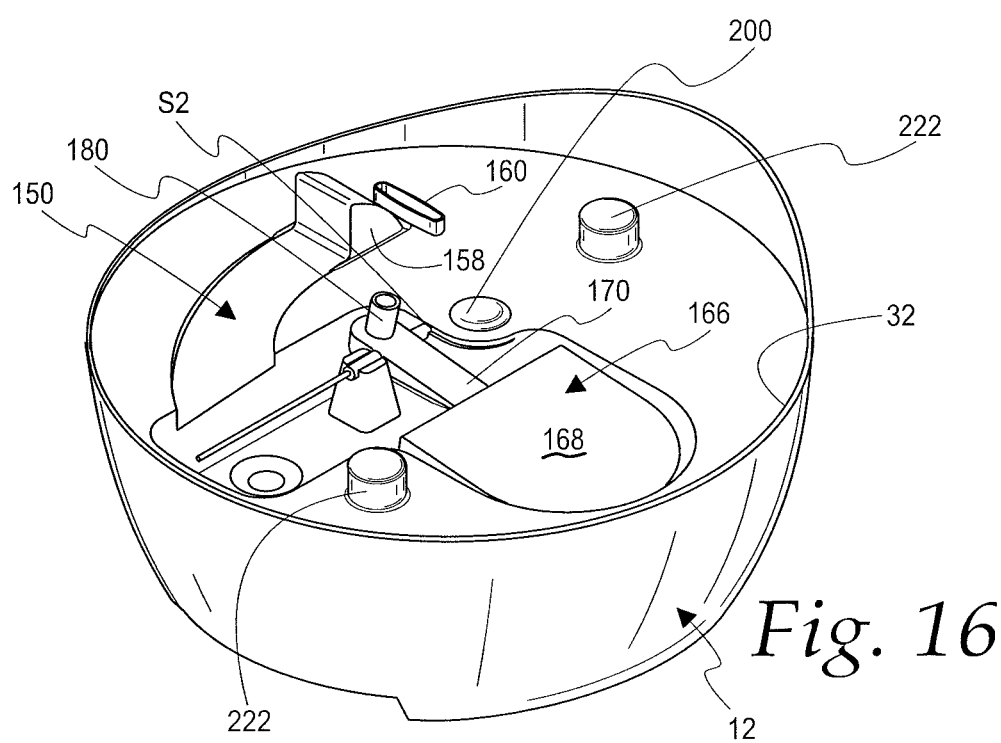
Figure 17:
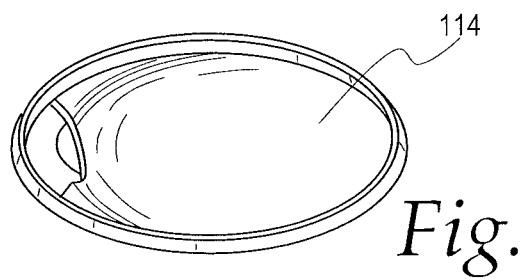
Figure 18:
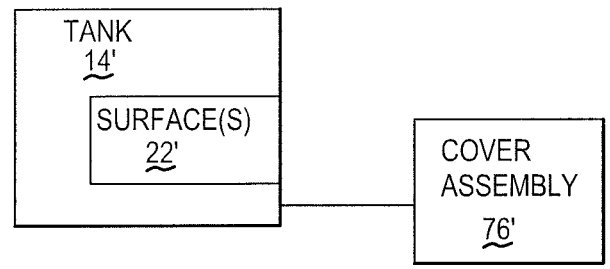
Figure 19:
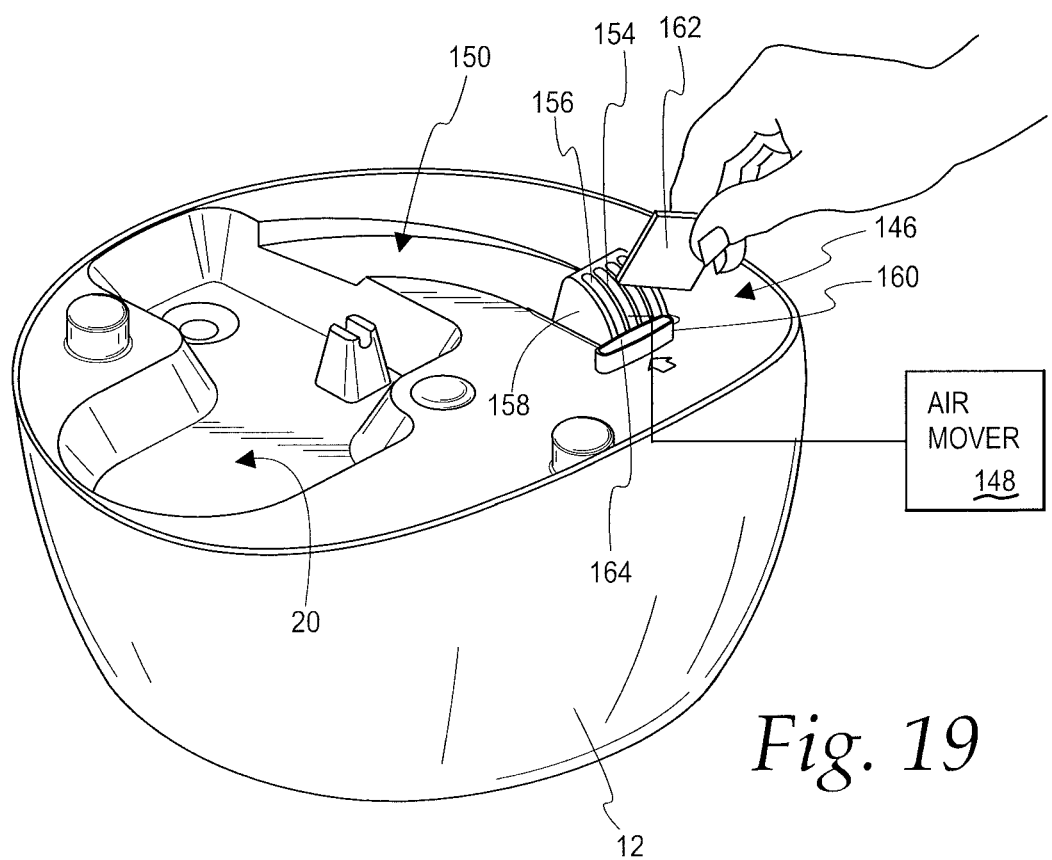
Figure 20:
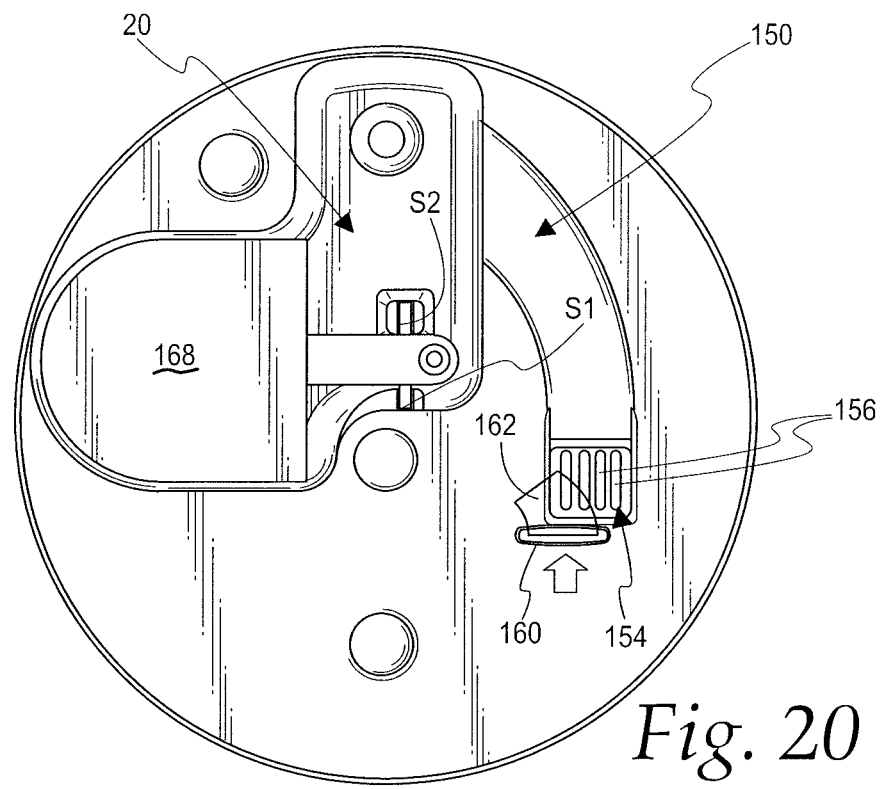
Figure 21:
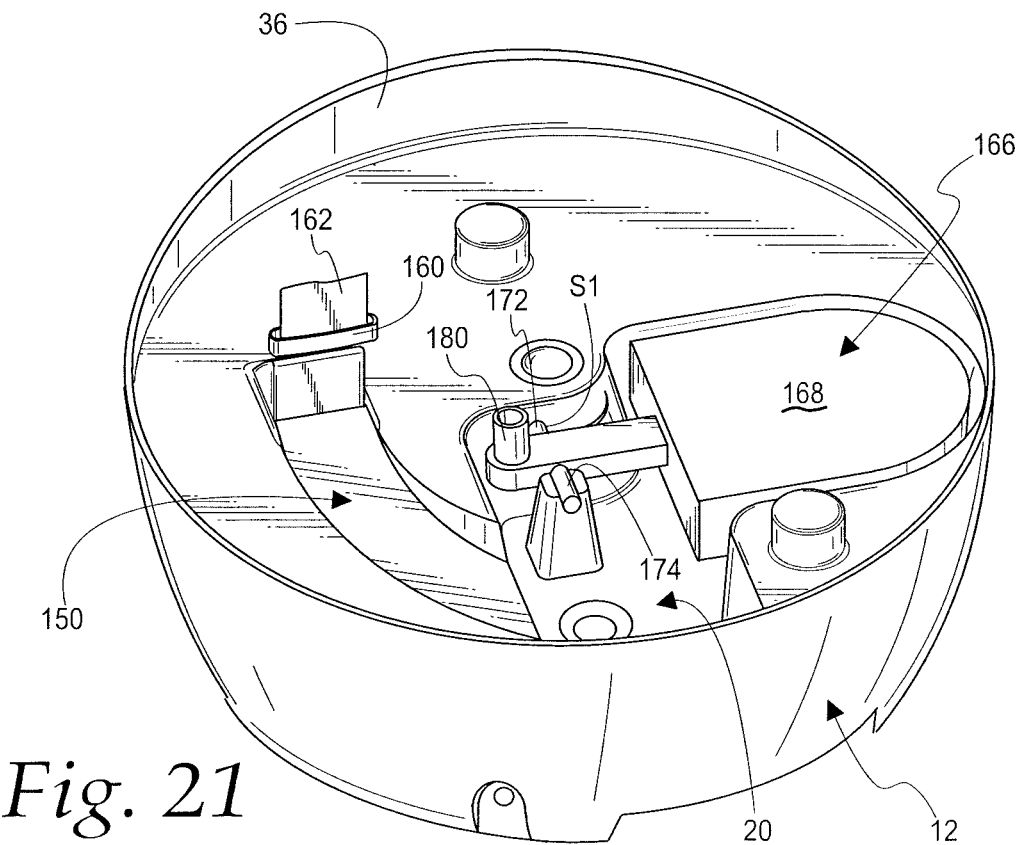

Another aspect of the unit 10 is the incorporation of a light 198, shown schematically on the frame 12 in FIG. 22, that projects upwardly through a sealed lens 200 on the frame 12, as seen in FIG. 16, and through an aligned, sealed lens 202 on the bottom wall 50 of the tank 14. Through a control 204, the light intensity and/or color can be selectively changed.

In FIG. 4. an actuator 206 is shown with an icon on the frame 12 that allows a user to press multiple times to select light intensity and/or color. The actuator 206 may perform a simple on/off feature as well.

Figure 27:
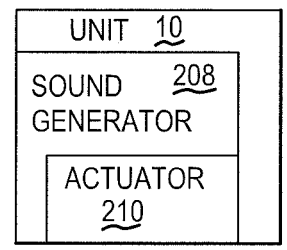
FIG. 27 is a schematic representation of a sound generator usable on the inventive air treatment unit.

As shown in FIG. 27, a sound generator 208 may be incorporated into the frame 12 and controlled through an external actuator 210, shown in FIG. 4 with an identifying icon on the frame 12. By tapping the actuator 210, a user can cycle through potentially different sounds. By holding the actuator 210, a volume of the sounds may be selected. Pressing all actuators herein a different number of times, or changing held pressing times, may control operating features.

The generated sound may be any sound, including generated sounds such as songs, soothing sounds, or conversion of transmitted signals from externally of the unit 10. These sounds may be associated with a timed alarm, as to provide a wake-up alarm.

Figure 26:
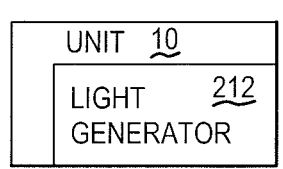
FIG. 26 is a schematic representation of a light generator provided on the inventive air treatment unit.

As shown in FIG. 26, the unit 10 may further include a light generator 212 capable of projecting images on walls and/or ceilings.

A power actuator 214 may be provided on the frame 12, as seen in FIG. 4. The actuator 214 may be of a type to perform a simple on/off function or may be held for different lengths of time to change the settings of the apparatus, such as the amount of humidity that is added.

Alternatively, as depicted, there may be three different settings, as identified in FIG. 4—low, medium, and high, or additional settings that the user can select.

Figure 28:
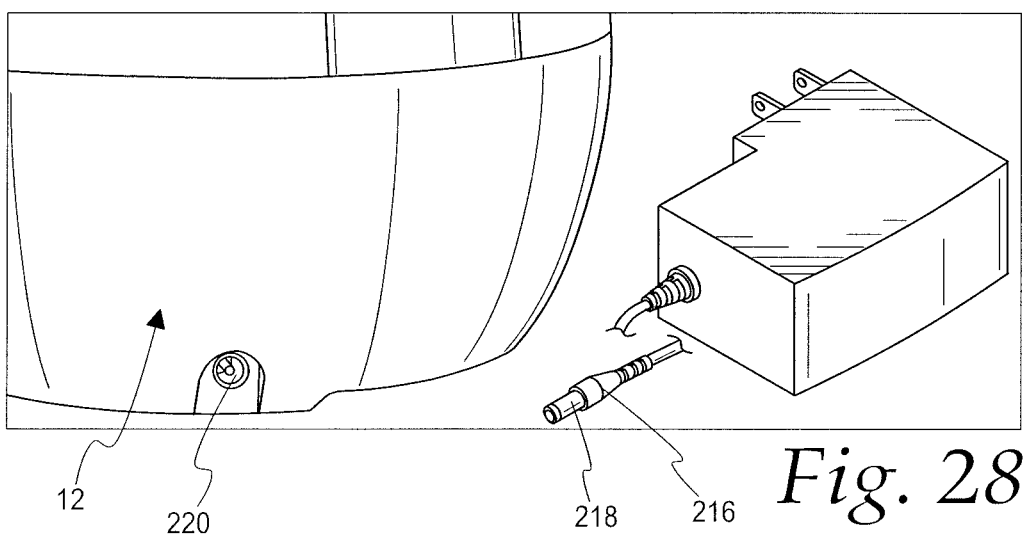
FIG. 28 is a fragmentary, perspective view of a bottom portion of the frame on the air treatment unit in FIGS. 4 and 5 with an adaptor for powering the unit through a household power supply.

While all operating components of the unit 10 may be powered by a self-contained source such as a battery, in this particular embodiment, the unit 10 is designed to operate off a conventional household power supply, converted to 24 volt DC. As shown in FIG. 28, an adapter cord 216 has a connector 218 that is preferably detachably press fit to a connector 220 on the frame 12.

To provide further stabilizing of the connection between the frame 12 and tank 14, additional cooperating components may be provided. As shown in FIG. 16, a pair of raised bosses 222 are provided on the frame 12 which project into cooperating, registrable receives 224 on the bottom wall 50 of the tank 14.

The foregoing disclosure of specific embodiments is intended to be illustrative of the broad concepts comprehended by the invention.

The invention claimed is:

1. A portable air treatment unit comprising:
a frame defining at least part of a fluid reservoir;
a tank on the frame bounding at least part of a volume in which a supply of fluid can be placed and having a peripheral wall;
a generator on the frame that causes fluid from the supply of fluid to be formed into droplets; and
the portable air treatment unit having an outlet for discharging fluid droplets formed by the generator to within a space within which the portable air treatment unit resides, wherein the air treatment unit is configured so that fluid droplets formed by the generator are moved in a controlled path between a first location, at which the fluid droplets are formed by the generator, and the outlet, wherein the controlled path is bounded by at least one surface formed integrally with the peripheral wall on the tank, wherein the portable air treatment unit is reconfigurable between: (a) a first state wherein at least a portion of the at least one surface can be directly accessed at a second location between the first location and outlet to facilitate cleaning of the at least portion of the at least one surface; and (b) a second state wherein direct access to the at least portion of the at least one surface at the second location is blocked, wherein the tank has a body and the portable air treatment unit further comprises a cover assembly, the cover assembly selectively changeable between: (a) a first position relative to the tank body wherein the portable air treatment unit is in the first state, and (b) a second position relative to the tank body wherein the portable air treatment unit is in the second state, wherein the peripheral wall on the tank has a peripheral surface extending around a vertical center axis and with the portable air treatment unit in the first state the at least portion of the at least one surface is exposed at the peripheral surface of the tank at the second location, wherein the tank has a top and bottom and the at least one surface bounds a channel that extends in a direction between the top and bottom of the tank, wherein the channel has a length and a “U” shape as viewed in cross section taken transversely to the length of the channel.

2. The portable air treatment unit according to claim 1 where the channel is at least partially recessed radially with respect to the vertical center axis from the peripheral surface of the tank.

3. The portable air treatment unit according to claim 1 wherein the channel has a length extending over at least a majority of a distance between the top and bottom of the tank.

4. The portable air treatment unit according to claim 3 wherein the tank has a vertical center axis and the channel opens radially with respect to the vertical center axis.

5. The portable air treatment unit according to claim 1 wherein the tank body bounds the volume within which the supply of fluid can be placed, wherein the channel is formed on the tank body, with the cover assembly in the first position the cover assembly is fully separated from the body, and with the cover assembly in the second position the cover assembly blocks an opening at the second location to close the channel at the second location.

6. The portable air treatment unit according to claim 5 wherein the cover assembly is configured to be changed from its first position into its second position by press connecting the cover assembly to the body as an incident of which the cover assembly is maintained in its second position.

7. The portable air treatment unit according to claim 6 wherein the cover assembly comprises a body with an elongate main portion with a length and a first wall projecting angularly with respect to the length of the elongate main portion away from the elongate main portion, the first wall situated below the channel and above the first location with the cover assembly in the second position.

8. The portable air treatment unit according to claim 6 wherein the cover assembly and tank body have elongate rib and elongate receptacle connectors that cooperate to create a seal between the cover assembly and tank body that causes an opening in the channel to be sealed by the cover assembly with the cover assembly in the second position.

9. The portable air treatment unit according to claim 1 wherein the tank peripheral surface extends around a vertically extending center axis and with the cover assembly in the second position circumferentially spaced edges of an outer surface of the cover assembly substantially flushly conform to the peripheral surface of the tank.

10. The portable air treatment unit according to claim 1 wherein the tank has a body with a top opening with the channel formed on the tank body, the portable air treatment unit further comprising a nozzle assembly that is separably attached to the tank body, the nozzle assembly comprising a plate that is situated over a top tank opening and has a discrete opening in registration with an opening at a top end of the channel.

11. The portable air treatment unit according to claim 10 wherein the nozzle assembly further comprises a guide component: (a) defining a funneling surface bounding a volume in communication with the discrete opening; and (b) defining the outlet for the portable air treatment unit.

12. The portable air treatment unit according to claim 11 wherein the plate on the nozzle assembly and guide component are configured to be movable, one relative to the other and the tank body to thereby selectively change a direction of discharging droplets at the outlet for the portable air treatment unit.

13. A portable air treatment unit comprising:
a frame defining at least part of a fluid reservoir;
a tank on the frame bounding at least part of a volume in which a supply of fluid can be placed and having a peripheral wall;
a generator on the frame that causes fluid from the supply of fluid to be formed into droplets; and
the portable air treatment unit having an outlet for discharging fluid droplets formed by the generator to within a space within which the portable air treatment unit resides,
wherein the air treatment unit is configured so that fluid droplets formed by the generator are moved in a controlled path between a first location, at which the fluid droplets are formed by the generator, and the outlet,
wherein the controlled path is bounded by at least one surface formed integrally with the peripheral wall on the tank,
wherein the portable air treatment unit is reconfigurable between: (a) a first state wherein at least a portion of the at least one surface can be directly accessed at a second location between the first location and outlet to facilitate cleaning of the at least portion of the at least one surface; and (b) a second state wherein direct access to the at least portion of the at least one surface at the second location is blocked,
wherein the tank has a body and the portable air treatment unit further comprises a cover assembly, the cover assembly selectively changeable between: (a) a first position relative to the tank body wherein the portable air treatment unit is in the first state, and (b) a second position relative to the tank body wherein the portable air treatment unit is in the second state,
wherein the cover assembly has a tab at the top of the cover assembly and a shoulder at the bottom of the cover assembly that captively engage the tank body, thereby tending to frictionally maintain the cover assembly in the second position,
wherein the peripheral wall on the tank has a peripheral surface extending around a vertical center axis and with the portable air treatment unit in the first state the at least portion of the at least one surface is exposed at the peripheral surface of the tank at the second location,
wherein the tank has a top and bottom and the at least one surface bounds a channel that extends in a direction between the top and bottom of the tank,
wherein the channel has a length and a "U" shape as viewed in cross section taken transversely to the length of the channel.

14. The portable air treatment unit according to claim 13 wherein the "U" shape changes progressively over at least a part of the length of the channel.

15. The portable air treatment unit according to claim 14 wherein the "U" shape is wider at a bottom location than at a top location on the channel.

16. A portable air treatment unit comprising:
a frame defining at least part of a fluid reservoir;
a tank on the frame bounding at least part of a volume in which a supply of fluid can be placed and having a peripheral wall;
a generator on the frame that causes fluid from the supply of fluid to be formed into droplets; and
the portable air treatment unit having an outlet for discharging fluid droplets formed by the generator to within a space within which the portable air treatment unit resides,
wherein the air treatment unit is configured so that fluid droplets formed by the generator are moved in a controlled path between a first location, at which the fluid droplets are formed by the generator, and the outlet,
wherein the controlled path is bounded by at least one surface formed integrally with the peripheral wall on the tank,
wherein the portable air treatment unit is reconfigurable between: (a) a first state wherein at least a portion of the at least one surface can be directly accessed at a second location between the first location and outlet to facilitate cleaning of the at least portion of the at least one surface; and (b) a second state wherein direct access to the at least portion of the at least one surface at the second location is blocked, wherein the tank has a top and bottom and the at least one surface bounds a channel with a length extending over at least a majority of a distance between the top and bottom of the tank, wherein the tank has a vertical center axis and the channel opens radially with respect to the vertical center axis, wherein the tank has a body and the portable air treatment unit further comprises a cover assembly, the cover assembly selectively changeable between: (a) a first position relative to the tank body wherein the portable air treatment unit is in the first state, and (b) a second position relative to the tank body wherein the portable air treatment unit is in the second state, wherein the tank body bounds the volume within which the supply of fluid can be placed, wherein the channel is formed on the tank body, with the cover assembly in the first position the cover assembly is fully separated from the body, and with the cover assembly in the second position the cover assembly blocks an opening at the second location to close the channel at the second location, wherein the cover assembly is configured to be changed from its first position into its second position by press connecting the cover assembly to the body as an incident of which the cover assembly is maintained in its second position, wherein the cover assembly comprises a body with an elongate main portion with a length and a first wall projecting angularly with respect to the length of the elongate main portion away from the elongate main portion, the first wall situated below the channel and above the first location with the cover assembly in the second position, wherein the first wall has a passage configured to guide upwardly moving fluid droplets formed by the generator through the first wall into the channel.

17. The portable air treatment unit according to claim 16 wherein the tank body has a depending guide wall that in conjunction with the cover assembly at least partially bounds a sub-volume below the channel.

18. The portable air treatment unit according to claim 17 wherein the air treatment unit further comprises a source of scented air that is delivered to the sub-volume and mixed with fluid droplets moving through the passage in the first wall.

19. A portable air treatment unit comprising:

a frame defining at least part of a fluid reservoir;

a tank on the frame bounding at least part of a volume in which a supply of fluid can be placed;

a generator on the frame that causes fluid from the supply of fluid to be formed into droplets; and the portable air treatment unit having an outlet for discharging fluid droplets formed by the generator to within a space within which the portable air treatment unit resides, wherein the air treatment unit is configured so that fluid droplets formed by the generator are moved in a controlled path between a first location, at which the fluid droplets are formed by the generator, and the outlet, wherein the controlled path is bounded by at least one surface, wherein the portable air treatment unit is reconfigurable between: (a) a first state wherein at least a portion of the at least one surface can be directly accessed at a second location between the first location and outlet to facilitate cleaning of the at least portion of the at least one surface; and (b) a second state wherein direct access to the at least portion of the at least one surface at the second location is blocked, wherein the tank has a top and bottom and the at least one surface bounds a channel with a length extending over at least a majority of a distance between the top and bottom of the tank, wherein the tank has a vertical center axis and the channel opens radially with respect to the vertical center axis, wherein the tank has a body and the portable air treatment unit further comprises a cover assembly, the cover assembly selectively changeable between: (a) a first position relative to the tank body wherein the portable air treatment unit is in the first state, and (b) a second position relative to the tank body wherein the portable air treatment unit is in the second state, wherein the tank body bounds the volume within which the supply of fluid can be placed, wherein the channel is formed on the tank body, with the cover assembly in the first position the cover assembly is fully separated from the body, and with the cover assembly in the second position the cover assembly blocks an opening at the second location to close the channel at the second location, wherein the cover assembly is configured to be changed from its first position into its second position by press connecting the cover assembly to the body, wherein the cover assembly and tank body have cooperating connectors in the form of an elongate rib on one of the cover assembly and tank body and a complementary elongate receptacle on the other of the cover assembly and tank body into which the elongate rib is press fit, the cooperating connectors configured so as to create a seal between the cover assembly and tank body that causes an opening in the channel to be sealed by the cover assembly with the cover assembly in the second position, as an incident of the cover assembly being changed from its first position into its second position.

20. The portable air treatment unit according to claim 19 wherein the elongate receptacle is bounded by a surface that engages a surface on the elongate rib with the elongate rib pressed into the elongate receptable and at least one of the surfaces is made from a material that deforms with the elongate rib pressed into the elongate receptacle to effect a seal.

21. A portable air treatment unit comprising:

a frame defining at least part of a fluid reservoir;

a tank on the frame bounding at least part of a volume in which a supply of fluid can be placed;

a generator on the frame that causes fluid from the supply of fluid to be formed into droplets; and the portable air treatment unit having an outlet for discharging fluid droplets formed by the generator to within a space within which the portable air treatment unit resides, wherein the air treatment unit is configured so that fluid droplets formed by the generator are moved in a controlled path between a first location, at which the fluid droplets are formed by the generator, and the outlet, wherein the controlled path is bounded by at least one surface, wherein the portable air treatment unit is reconfigurable between: (a) a first state wherein at least a portion of the at least one surface can be directly accessed at a second location between the first location and outlet to facilitate cleaning of the at least portion of the at least one surface; and (b) a second state wherein direct access to the at least portion of the at least one surface at the second location is blocked, wherein the tank has a top and bottom and the at least one surface bounds a channel with a length extending over at least a majority of a distance between the top and bottom of the tank, wherein the tank has a vertical center axis and the channel opens radially with respect to the vertical center axis, wherein the tank has a body and the portable air treatment unit further comprises a cover assembly, the cover assembly selectively changeable between: (a) a first position relative to the tank body wherein the portable air treatment unit is in the first state, and (b) a second position relative to the tank body wherein the portable air treatment unit is in the second state, wherein the tank body bounds at least part of the volume within which the supply of fluid can be placed, wherein the channel is formed on the tank body, with the cover assembly in the first position the cover assembly is fully separated from the body, and with the cover assembly in the second position the cover assembly blocks an opening at the second location to close the channel at the second location, wherein the cover assembly and tank body have cooperating connectors in the form of an elongate rib on one of the cover assembly and tank body and a complementary elongate receptacle on the other of the cover assembly and tank body into which the elongate rib is press fit, the cooperating connectors configured so as to create a seal between the cover assembly and tank body that causes an opening in the channel to be sealed by the cover assembly with the cover assembly in the second position, as an incident of the cover assembly being changed from its first position into its second position.

22. The portable air treatment unit according to claim 21 wherein the at least one surface is spaced radially away from the vertical axis over an entire vertical extent of the at least one surface.

23. A portable air treatment unit comprising:

a frame defining at least part of a fluid reservoir;

a tank on the frame bounding at least part of a volume in which a supply of fluid can be placed and having a peripheral wall;

a generator on the frame that causes fluid from the supply of fluid to be formed into droplets; and the portable air treatment unit having an outlet for discharging fluid droplets formed by the generator to within a space within which the portable air treatment unit resides, wherein the air treatment unit is configured so that fluid droplets formed by the generator are moved in a controlled path between a first location, at which the fluid droplets are formed by the generator, and the outlet, wherein the controlled path is bounded by at least one surface formed integrally with the peripheral wall on the tank, wherein the portable air treatment unit is reconfigurable between: (a) a first state wherein at least a portion of the at least one surface can be directly accessed at a second location between the first location and outlet to facilitate cleaning of the at least portion of the at least one surface; and (b) a second state wherein direct access to the at least portion of the at least one surface at the second location is blocked, wherein the tank has a body and the portable air treatment unit further comprises a cover assembly, the cover assembly selectively changeable between: (a) a first position relative to the tank body wherein the portable air treatment unit is in the first state, and (b) a second position relative to the tank body wherein the portable air treatment unit is in the second state, wherein the cover assembly has a tab at the top of the cover assembly and a shoulder at the bottom of the cover assembly that captively engage the tank body, thereby tending to frictionally maintain the cover assembly in the second position, wherein the tab, shoulder, and tank body are configured so that the tab and shoulder cooperate with the tank body to allow the cover assembly to be press fit into the second position.

24. The portable air treatment unit according to claim 23 wherein at least one of the tab and a region of the cover assembly at which the shoulder is defined is sufficiently resilient that as the cover assembly is press fit into the second position the cover assembly deforms in the vicinity of the at least one of the tab and the region of the cover assembly at which the shoulder is defined to create a resilient restoring force that enhances a captive holding force of the cover assembly on the tank body with the cover assembly in the second position.

* * * * *